United States Patent [19]

Hokuyo et al.

[11] Patent Number: 5,609,906
[45] Date of Patent: Mar. 11, 1997

[54] ANTI-BLOOMING COMPOSITION, AND LAURIN FAT AND CHOCOLATE CONTAINING THE SAME

[75] Inventors: Kosuke Hokuyo; Miho Hayashi; Shuichi Yamaguchi; Tsugio Izumi, all of Osaka-fu, Japan

[73] Assignee: Fuji Oil Company, Limited, Osaka-fu, Japan

[21] Appl. No.: 401,369

[22] Filed: Mar. 9, 1995

[30] Foreign Application Priority Data

Mar. 11, 1994 [JP] Japan ................................. 6-041567

[51] Int. Cl.$^6$ .................................................. A23G 1/00
[52] U.S. Cl. ........................ 426/660; 426/607; 426/610
[58] Field of Search .................................. 426/604, 606, 426/607, 610, 660

[56] References Cited

U.S. PATENT DOCUMENTS

| 3,796,816 | 3/1974 | Hasman et al. | 426/201 |
| 4,588,604 | 5/1986 | Baker et al. | 426/601 |
| 5,057,319 | 10/1991 | Gottwald | 424/441 |

FOREIGN PATENT DOCUMENTS

| 2334747 | 8/1977 | France. |
| 2208466 | 4/1989 | United Kingdom. |

OTHER PUBLICATIONS

Minifie 1980 Chocolate, Cocoa and Confectionery: Science and Technology 2nd ed AVI Publishing Westport CT pp. 208–217, 314, 315,323–324.

Gurr 1971 Lipid Biochemistry Cornell University Press, New York pp. 24–25.

Abstract of JP–03–090029, Tokyo Tanabe KK, "Suppositories Containing Danazol and Polyoxyethylene Alkyl Ether(s)", Apr. 1991.

*Primary Examiner*—Carolyn Paden
*Attorney, Agent, or Firm*—Wenderoth, Lind & Ponack

[57] ABSTRACT

An anti-blooming composition which comprises a fatty acid monoglyceride composed of a fatty acid having 16 carbon atoms (A) and a fatty acid monoglyceride composed of a fatty acid having 18 carbon atoms (B), a weight ratio of A/B being 30/70 or larger is disclosed. A laurin fat and laurin fat chocolate containing the above anti-blooming composition is also disclosed.

2 Claims, No Drawings

ANTI-BLOOMING COMPOSITION, AND LAURIN FAT AND CHOCOLATE CONTAINING THE SAME

FIELD OF THE INVENTION

The present invention relates to an anti-blooming composition, particularly, that suitable for preventing fat blooming of laurin fats and a laurin fat and chocolate containing the same.

BACKGROUND OF THE INVENTION

In general, the quality of chocolate is greatly influenced by the raw materials used and various production conditions and, in particular, sufficient care should be taken not to form fat blooming which stains the surface of a product in off-white during its storage, resulting in loss of commercial value of the product.

A laurin fat, the main constituent fatty acid of which is lauric acid having 12 carbon atoms, has been known to be a raw material fat for the production of chocolate which does not require a tempering operation and, in addition to the production of bar chocolate, it has been used for the production of chocolate for coating cakes, doughnuts, biscuits and the like by blending suitable other oils and fats. However, the problem of fat blooming is still present.

Heretofore, various studies have been made to prevent or control fat blooming of chocolate using laurin fats (hereinafter sometimes referred to as "laruin fat chocolate"). Such studies include improvement of production processes of chocolate, modification of fats to be used, addition of surfactants as anti-blooming agents and the like.

As examples of addition of surfactants, JP-A 61-67444 discloses addition of a sorbitan saturated fatty acid ester together with a glycerin saturated fatty acid ester to a fat ingredient of chocolate. JP-A 64-39945 and JP-A 2-35042 disclose the addition of certain sugar fatty acid esters.

These conventional methods give certain improvements in the production of bar chocolate. However, for the production of covering chocolate, they are still insufficient. In addition, there is another problem that the use of sorbitan saturated fatty acid esters and sugar fatty acid esters debases the flavor of chocolate.

OBJECTS OF THE INVENTION

The main object of the present invention is to prevent or control fat blooming in the production of laurin fat chocolate which is used for coating with out debasement of the flavor.

This object as well as other objects and advantages of the present invention will become apparent to a person skilled in the art from the following description.

SUMMARY OF THE INVENTION

According to the present invention, there is provided an anti-blooming composition which comprises a fatty acid monoglyceride composed of a fatty acid having 16 carbon atoms (A) and a fatty acid monoglyceride composed of a fatty acid having 18 carbon atoms (B), the weight ratio of A/B being 30/70 or higher.

The present invention also provide a laurin fat and laurin fat chocolate containing the anti-blooming composition of the present invention.

DETAILED DESCRIPTION OF THE INVENTION

The present inventors have contemplated preventing the fat blooming of chocolate by depositing fine crystals of a fat ingredient in chocolate and improving affinity thereof for other raw materials and have made a study of various surfactants including fatty acid monoglycerides which has not been fully investigated heretofore in the prior art. As a result, it has been surprisingly found that certain monoglycerides having specific fatty acid residues can effectively prevent fat blooming of laurin fat chocolate even for using coating purpose. Thus, the present invention is completed.

That is, the anti-blooming composition of the present invention comprises a fatty acid monoglyceride composed of a fatty acid having 16 carbon atoms (A) and a fatty acid monoglyceride composed of a fatty acid having 18 carbon atoms (B), the weight ratio of A/B being 30/70 or larger.

The constituent fatty acids of both monoglycerides (A) and (B) should have 16 and 18 carbon atoms, respectively. When these constituent fatty acids of monoglycerides are other than these, anti-blooming effect becomes weak. The fatty acids may be saturated or unsaturated.

When the weight ratio of A/B is smaller than 30/70, anti-blooming effect is scarcely expected. On the other hand, the weight ratio of A/B becomes larger, anti-blooming effect tends to become higher up to the weight ratio of 80/20.

In the anti-blooming composition of the present invention, if necessary, other surfactants such as sorbitan fatty acid esters and the like can be added in a suitable amount.

The anti-blooming composition can be produced, for example, by admixing the monoglycerides in the above weight ratio in a conventional manner together with other surfactants, if necessary.

The anti-blooming composition can be used for the production of laurin fat chocolate by adding it in any suitable production steps. For example, it can be added to raw fat material or chocolate during the conching step to produce chocolate having improved anti-blooming properties.

In particular, a laurin fat containing the anti-blooming composition of the present invention can be used for a raw material fat for the production of chocolate having improved anti-blooming property.

Thus, the laurin fat of the present invention is characterized by containing the monoglyceride (A) and the monoglyceride (B) in the above weight ratio in a total amount of (A)+(B) of at least 0.5% by weight, preferably 1.5 to 2.5% by weight, based on the laurin fat. The laurin fat of the present invention can be produced by admixing a laurin fat such as palm kernel oil, coconut oil, babassu oil and the like and the anti-blooming composition of the present invention or the above-described monoglycerides in the above weight ratio, separately, according to a known method.

The chocolate of the present invention is characterized by using a laurin fat containing the monoglyceride (A) and the monoglyceride (B) in the above weight ratio in an total amount of (A)+(B) of at least 0.5% by weight, preferably 1.5 to 2.5% by weight based on the fat ingredient of the chocolate. When the amount of the monoglycerides is less than 0.5% by weight based on the fat ingredient of the chocolate, the desired anti-blooming effect is not expected and, on the other hand, when the amount exceeds 2.5% by weight, any further improvement of anti-blooming effect is not expected.

The monoglycerides can be added in the form of the anti-blooming composition of the present invention, the laurin fat of the present invention or the above-described monoglycerides in the above weight ratio, separately. The other ingredients of the chocolate of the present invention are not limited and any conventional ingredient can be employed.

The production steps of chocolate are not limited to specific ones and any conventional steps such as rolling, refining, conching and the like can be employed. Thus, the chocolate of the present invention may be, for example, milk chocolate, black chocolate, white chocolate and the like and they may be solid chocolate, center chocolate, coating or covering chocolate and the like.

The following Examples and Comparative Examples further illustrate the present invention in detail but are not to be construed to limit the scope of the present invention. All the "percents" in Examples and Comparative Examples are by weight unless otherwise stated.

EXAMPLE 1

An anti-blooming composition comprising monoglycerin palmirate (palmitic acid: 16 carbon atoms) (A) and monoglycerin stearate (stearic acid: 18 carbon atoms) (B) in the weight ratio of A/B of 50/50 was added to chocolate having the basic formulation as shown in Table 1 in an amount of 2.0% and chocolate was produced according to a conventional manner. As the laurin hard butter of the basic formulation, a fractionated palm kernel oil was used.

This chocolate was coated on crunch candy with a rotary pan and the resulting product was subjected to a storage test.

TABLE 1

| Ingredient | % |
| --- | --- |
| Cocoa powder | 9.0 |
| Skimmed milk powder | 12.0 |
| Laurin hard butter | 34.0 |
| Powdered sugar | 45.0 |
| Lecithin | 0.5 |
| Vanillin | 0.02 |

EXAMPLE 2

An anti-blooming composition similar to that of Example 1 (A/B=60/40) was added to the basic formulation of Table 1 in an amount of 2.0% and, according to the same manner as described in Example 1, chocolate was produced.

This chocolate was coated on crunch candy with a rotary pan and the resulting product was subjected to a storage test.

EXAMPLE 3

An anti-blooming composition similar to that of Example 1 (A/B=40/60) was added to the basic formulation of Table 1 in an amount of 2.5% and, according to the same manner as described in Example 1, chocolate was produced.

This chocolate was coated on crunch candy with a rotary pan and the resulting product was subjected to a storage test.

EXAMPLE 4

An anti-blooming composition similar to that of Example 1 (A/B=50/50) was added to the basic formulation of Table 1 in an amount of 2.5% and, according to the same manner as described in Example 1, chocolate was produced.

This chocolate was cast in a mold and, after standing at 5° C. for 30 minutes, the mold was released and the product was aged at 20° C. for 1 week and was subjected to a storage test.

EXAMPLE 5

An anti-blooming composition similar to that of Example 1 (A/B=50/50) was added to the basic formulation of Table 1 in an amount of 1.5% and, according to the same manner as described in Example 1, chocolate was produced.

This chocolate was coated on almonds with a rotary pan and the resulting product was subjected to a storage test.

COMPARATIVE EXAMPLE 1

According to the same manner as described in Example 1, chocolate was produced except that a fatty acid monoglyceride the constituent fatty acid of which had 12 carbon atoms was added in an amount of 2.0% instead of the anti-blooming agent.

This chocolate was coated on crunch candy and the product was subjected to a storage test.

COMPARATIVE EXAMPLE 2

According to the same manner as described in Example 1, chocolate was produced except that a fatty acid monoglyceride the constituent fatty acid of which had 18 carbon atoms was added in an amount of 2.0% instead of the anti-blooming agent.

This chocolate was coated on crunch candy and the product was subjected to a storage test.

COMPARATIVE EXAMPLE 3

According to the same manner as described in Example 1, chocolate was produced except that an anti-blooming composition similar to that of Example 1 (A/B=20/80) was added in an amount of 2.5% instead of the anti-blooming agent.

This chocolate was coated on crunch candy and the product was subjected to a storage test.

COMPARATIVE EXAMPLE 4

According to the same manner as described in Example 1, chocolate was produced except that an anti-blooming composition similar to that of Example 1 (A/B=20/80) was added in an amount of 2.5% instead of the anti-blooming agent.

This chocolate was cast in a mold and, after standing at 5° C. for 30 minutes, the mold was released and the product was aged at 20° C. for 1 week and was subjected to a storage test.

COMPARATIVE EXAMPLE 5

According to the same manner as described in Example 1, chocolate was produced except that a fatty acid monoglyceride the constituent fatty acid of which had 12 carbon atoms was added in an amount of 2.5% instead of the anti-blooming agent.

This chocolate was cast in a mold and, after standing at 5° C. for 30 minutes, the mold was released and the product was aged at 20° C. for 1 week and was subjected to a storage test.

COMPARATIVE EXAMPLE 6

According to the same manner as described in Example 1, chocolate was produced except that no surfactant was added.

This chocolate was coated on crunch candy and the product was subjected to a storage test.

Results

TABLE 2

| | Days required for formation of fat blooming | | Surfactant added | | |
|---|---|---|---|---|---|
| | 15° C. | 20° C. | $C_{12}$ | A/B | Total (%) |
| Example 1 | 74 | 132 | — | 50/50 | 2.0 |
| Example 2 | 70 | 137 | — | 60/40 | 2.5 |
| Example 3 | 65 | 120 | — | 40/60 | 2.5 |
| Example 5 | 68 | 128 | — | 50/50 | 1.5 |
| Comp. Example 1 | 55 | 96 | 2.0 | — | 2.0 |
| Comp. Example 2 | 40 | 89 | — | 0/100 | 2.0 |
| Comp. Example 3 | 51 | 96 | — | 20/80 | 2.5 |
| Comp. Example 6 | 52 | 93 | — | — | — |
| Example 4 | 192 | 149 | — | 50/50 | 2.5 |
| Comp. Example 4 | 153 | 111 | — | 20/80 | 2.5 |
| Comp. Example 5 | 161 | 123 | 2.5 | — | 2.5 |

As seen from Table 2, in the coating test, when the weight ratio of A/B is less than 20/80, anti-blooming effect is scarcely expected (Comparative Examples 1–3), while the product of Examples 1–3 show excellent anti-blooming effect.

In the casting test, likewise, Example 4 showed more superior effect to Comparative Example 4.

As seen from the results of Comparative Examples 1 and 5, when the number of carbon atoms of the constituent fatty acid of the monoglyceride is 12, anti-blooming effect is scarcely expected.

In addition, the addition of monoglycerides of the present invention does not debase flavor of chocolate.

As described hereinabove, according to the present invention, it is possible to provide an anti-blooming composition which does not debase flavor and to obtain laurin fat chocolate having improved anti-blooming property.

What is claimed is:

1. Chocolate comprising a laurin fat containing a fatty acid monoglyceride composed of a fatty acid having 16 carbon atoms (A) and a fatty acid monoglyceride composed of a fatty acid having 18 carbon atoms (B), a weight ratio of A/B being 40/60 to 60/40 in an total amount of A+B of at least 0.5% by weight on the fat ingredient of chocolate.

2. Chocolate according to claim 1, wherein the total amount of A+B is 1.5 to 2.5% by weight based on the fat ingredient of chocolate.

* * * * *